United States Patent
Zheng

(10) Patent No.: US 10,701,924 B2
(45) Date of Patent: Jul. 7, 2020

(54) MOSQUITO-KILLING ILLUMINATING LAMP

(71) Applicant: Ningbo Dayang Industry and Trade Co., Ltd., Zhejiang (CN)

(72) Inventor: Jun Zheng, Zhejiang (CN)

( * ) Notice: Subject to any disclaimer, the term of this patent is extended or adjusted under 35 U.S.C. 154(b) by 387 days.

(21) Appl. No.: 15/823,576

(22) Filed: Nov. 28, 2017

(65) Prior Publication Data

US 2019/0159441 A1 May 30, 2019

(51) Int. Cl.
| | |
|---|---|
| *A01M 1/08* | (2006.01) |
| *A01M 1/06* | (2006.01) |
| *C25B 9/06* | (2006.01) |
| *C25B 1/00* | (2006.01) |
| *A01M 1/02* | (2006.01) |
| *C25B 11/12* | (2006.01) |
| *A01M 1/04* | (2006.01) |

(52) U.S. Cl.
CPC .............. *A01M 1/08* (2013.01); *A01M 1/023* (2013.01); *A01M 1/04* (2013.01); *A01M 1/06* (2013.01); *C25B 1/00* (2013.01); *C25B 9/06* (2013.01); *C25B 11/12* (2013.01)

(58) Field of Classification Search
CPC .......... A01M 1/023; A01M 1/08; A01M 1/04; A01M 1/06; C25B 1/00; C25B 9/00; C25B 11/12
USPC .......................................................... 43/138
See application file for complete search history.

(56) References Cited

U.S. PATENT DOCUMENTS

| | | | | |
|---|---|---|---|---|
| 8,109,036 | B1* | 2/2012 | Wilbanks | A01M 1/023 43/112 |
| 2008/0168702 | A1* | 7/2008 | Jaffrey | A01M 1/023 43/111 |
| 2012/0060406 | A1* | 3/2012 | Schneidmiller | A01M 1/023 43/123 |
| 2012/0117858 | A1* | 5/2012 | Ishii | A01M 1/023 43/139 |
| 2016/0212984 | A1* | 7/2016 | Fang | A01M 1/08 |
| 2018/0000093 | A1* | 1/2018 | Nchekwube | A01M 1/04 |
| 2018/0042211 | A1* | 2/2018 | Zamboni | A01M 1/026 |

(Continued)

FOREIGN PATENT DOCUMENTS

CA 2831623 A1 * 10/2012 ............. G04C 23/00

*Primary Examiner* — Christopher P Ellis
(74) *Attorney, Agent, or Firm* — Prakash Nama; Global IP Services, PLLC

(57) ABSTRACT

The present invention relates to a mosquito-killing illuminating lamp which comprises a casing and a control unit. The casing comprises an illuminating portion and a mosquito-killing portion. The illuminating portion is provided with illuminating components therein. An electrolysis carbon dioxide generating device and a fan are provided inside the mosquito-killing portion. The control unit controls operation of the illuminating components, the carbon dioxide generating device and the fan. The electrolysis carbon dioxide generating device comprises a box body and electrolysis components. The electrolysis components are provided inside the box body. An electrolyte solution is provided inside the box body. The box body is provided with a venting hole. The electrolysis components comprise a graphite electrode and a cathode plate. After conduction between the graphite electrode and the cathode plate, electrolysis is performed on the electrolyte solution to generate carbon dioxide.

10 Claims, 4 Drawing Sheets

(56) References Cited

U.S. PATENT DOCUMENTS

2018/0092344 A1* 4/2018 Tyler ................. A01M 1/02
2018/0206472 A1* 7/2018 Maxik ................ A01M 1/023
2018/0310542 A1* 11/2018 Pearce ............... A01M 1/06

* cited by examiner

MOSQUITO-KILLING ILLUMINATING LAMP

BACKGROUND OF THE INVENTION

The present invention relates to illumination technology and more particularly pertains to a mosquito-killing illuminating lamp.

As flying insects such as bugs, mosquitoes and so forth are phototaxis, they usually gather at places with light. To prevent from getting bit by mosquitoes and insects and gathering of flying insects, various mosquito-killing apparatus has been developed, examples of which include specialized mosquito-killing lamps which utilize optical fibers for luring and trapping mosquitoes and insects and utilize high-voltage grids to kill the mosquitoes and insects by electrocution, small fans on desk lamps, mosquito repellent incense stands and adhesive tapes.

The Chinese Intellectual Property Office has published a utility model patent about a mosquito-killing light bulb under publication number CN205040481. The mosquito-killing light bulb comprises a lamp holder for connecting with a socket and an illuminating member. An illumination control circuit board and a mosquito-killing circuit board are provided inside the lamp holder. The illuminating member is connected to a connector and the illumination control circuit board. The mosquito-killing apparatus is connected to the connector and the mosquito-killing circuit board. The mosquito-killing apparatus comprises a high-voltage grid and a mosquito-luring lamp. The mosquito-luring lamp lures mosquitoes into the lamp holder, and the mosquitoes are then killed by the high-voltage grid by electrocution. Such mosquito-killing light bulb has good mosquito-killing effect, but there are still some mosquitoes left indoor to bite human beings, thus disturbing sleep of the users.

BRIEF SUMMARY OF THE INVENTION

In view of the aforesaid disadvantages now present in the prior art, the present invention provides a mosquito-killing illuminating lamp with good effect and effectively prevent mosquitoes from escaping and prevent users from being bit by mosquitoes.

To attain this, the present invention provides a mosquito-killing illuminating lamp which comprises a casing and a control unit. The casing comprises an illuminating portion and a mosquito-killing portion. The illuminating portion is provided with illuminating components therein. The mosquito-killing portion has a side wall which is provided with at least one opening for mosquitoes and insects to enter. An electrolysis carbon dioxide generating device and a fan are provided inside the mosquito-killing portion. The control unit controls operation of the illuminating components, the carbon dioxide generating device and the fan. The electrolysis carbon dioxide generating device comprises a box body and electrolysis components. The electrolysis components are provided inside the box body. An electrolyte solution is provided inside the box body. The box body is provided with a venting hole. The electrolysis components comprise a graphite electrode and a cathode plate. After conduction between the graphite electrode and the cathode plate, electrolysis is performed on the electrolyte solution to generate carbon dioxide.

The mosquito-killing illuminating lamp of the present invention with the aforementioned structure has the following advantages in comparison with the prior art:

As the mosquito-killing illuminating lamp of the present invention is provided with a mosquito-killing portion, it has mosquito-killing function apart from illumination function. The mosquito-killing portion is provided with the electrolysis carbon dioxide generating device and the fan therein; the electrolysis carbon dioxide generating device releases carbon dioxide to lure mosquitoes inside the casing and the fan sucks the mosquitoes into the casing and dries them to death. The combination of the electrolysis carbon dioxide generating device and the fan produces excellent mosquito-killing effect and is very environmental-friendly. It also effectively prevents mosquitoes from escaping and prevents users from being bit by mosquitoes, thus improving sleeping quality. After conduction between the graphite electrode and the cathode plate of the electrolysis carbon dioxide generating device electrolysis is performed on the electrolyte solution to generate carbon dioxide; the carbon dioxide generating effect is better and more environmental-friendly.

As an improvement, the box body is removably attached inside the casing. The box body comprises a bottom and a cover. The cover covers on top of the bottom. With the aforementioned structure, the present invention is simple in structure and convenient to disassemble and assemble.

As an improvement, inverted L-shaped openings which face downward are provided inside the casing. The bottom has an outer wall which is provided with radial protruding rods. The radial protruding rods are inserted into the inverted L-shaped openings. With the aforementioned structure, the present invention is simple in structure and convenient to disassemble and assemble.

As an improvement, the bottom has an outer side wall which is provided with a radial flange. The radial flange has an edge which extends upward to form a rim. The radial flange is provided with a plurality of ventilation holes. The radial protruding rods are disposed on an outer wall of the rim. With the aforementioned structure, the bottom could serve as a mosquito collecting container, thus rendering the structure of the present invention more simple and compact.

As an improvement, the venting hole is provided on top of the cover. The venting hole is provided with a plug inside. The plug is provided with a cross-slit. With the aforementioned structure, the electrolyte solution inside the casing is prevented from spilling out: with the cross-slit structure, when the carbon dioxide generated by the carbon dioxide generating device reaches a certain amount, it could push open the cross-slit and discharge from the cross-slit.

As an improvement, the fan is positioned above the carbon dioxide generating device. The fan has an upward facing air inlet and a downward facing air outlet. With the aforementioned structure, the present invention has a reasonable structure.

As an improvement, a mosquito-luring lamp is provided inside the casing. The mosquito-luring lamp is positioned above the fan. With the aforementioned structure, the mosquito-luring effect is better with the mosquito-luring lamp.

As an improvement, the casing comprises an upper casing and a lower casing. The mosquito-killing portion is formed inside the upper casing. The illuminating portion is formed inside the lower casing. A first side of the lower casing is pivotally connected to a first side of the upper casing. A second side of the lower casing is connected to a second side of the upper casing by a buckle. A gap is provided between the upper casing and the lower casing. With the aforementioned structure, the upper casing and the lower casing could be conveniently opened for convenient replacement of the carbon dioxide generating device.

As an improvement, the first side of the lower casing is connected to the first side of the upper casing by a hinge. With the aforementioned structure, the present invention is simple in structure and convenient to disassemble and assemble.

As an improvement, the openings are provided on a side wall of the upper casing; there are a plurality of the openings. With the aforementioned structure, the structure design is reasonable and simple.

In the figures, 1 denotes the casing; 101 denotes the illuminating portion; 102 denotes the mosquito-killing portion; 103 denotes the openings; 104 denotes the upper casing; 105 denotes the lower casing; 106 denotes the inverted L-shaped opening; 2 denotes the electrolysis carbon dioxide generating device; 201 denotes the venting hole; 202 denotes the graphite electrode; 203 denotes the cathode plate; 204 denotes the bottom; 205 denotes the cover; 206 denotes the radial flange; 207 denotes the radial protruding rods; 208 denotes the rim; 209 denotes the plug; 210 denotes the cross-slit; 211 denotes the ventilation holes; 3 denotes the fan; 4 denotes the mosquito-luring lamp; 5 denotes the hinge.

DETAILED DESCRIPTION OF THE INVENTION

The present invention is further described with a preferred embodiment and the accompanying drawings, but the present invention is not limited thereby.

Figure 1:
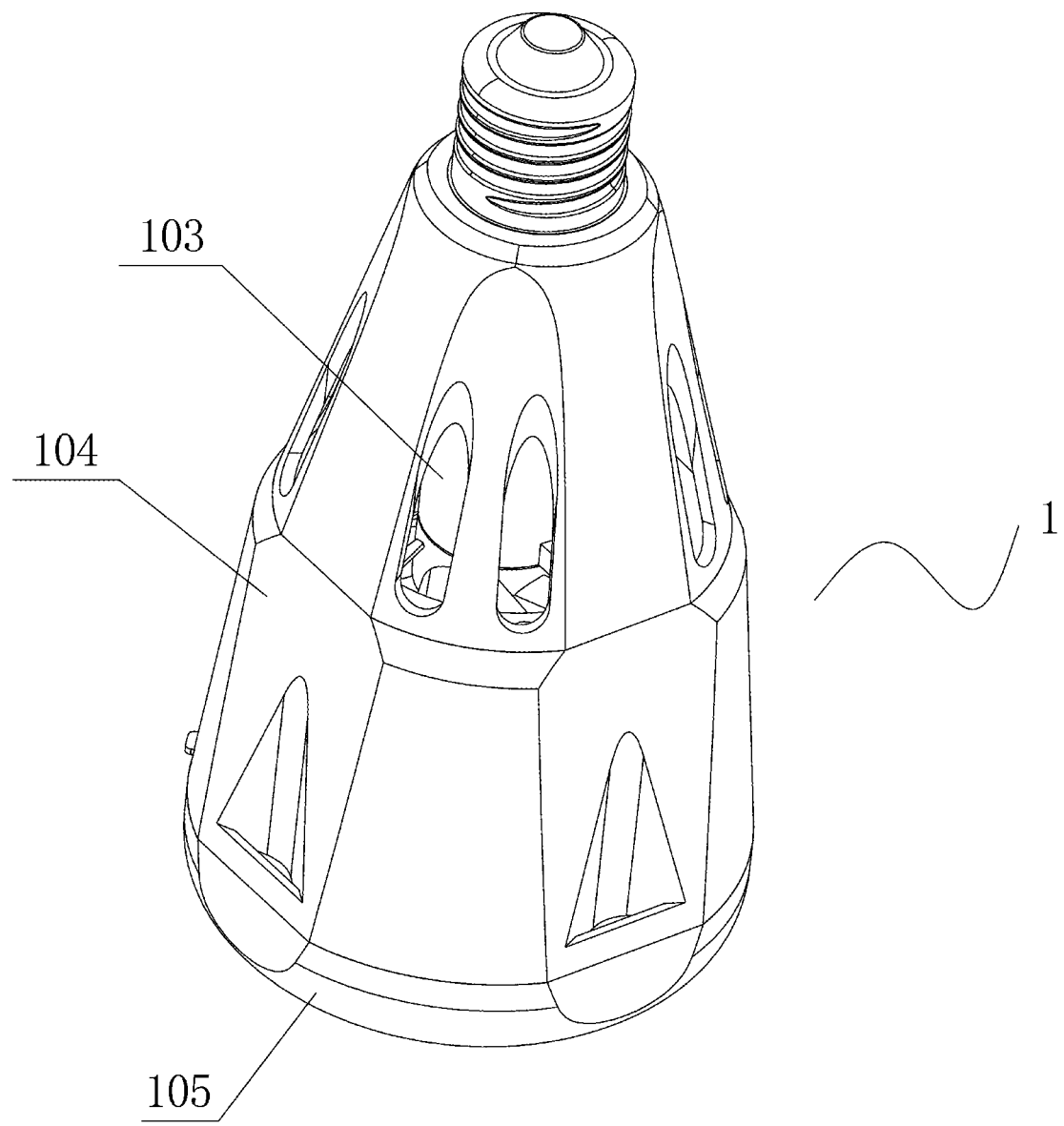
FIG. 1 is a perspective view of the mosquito-killing illuminating lamp of the present invention.
Figure 2:
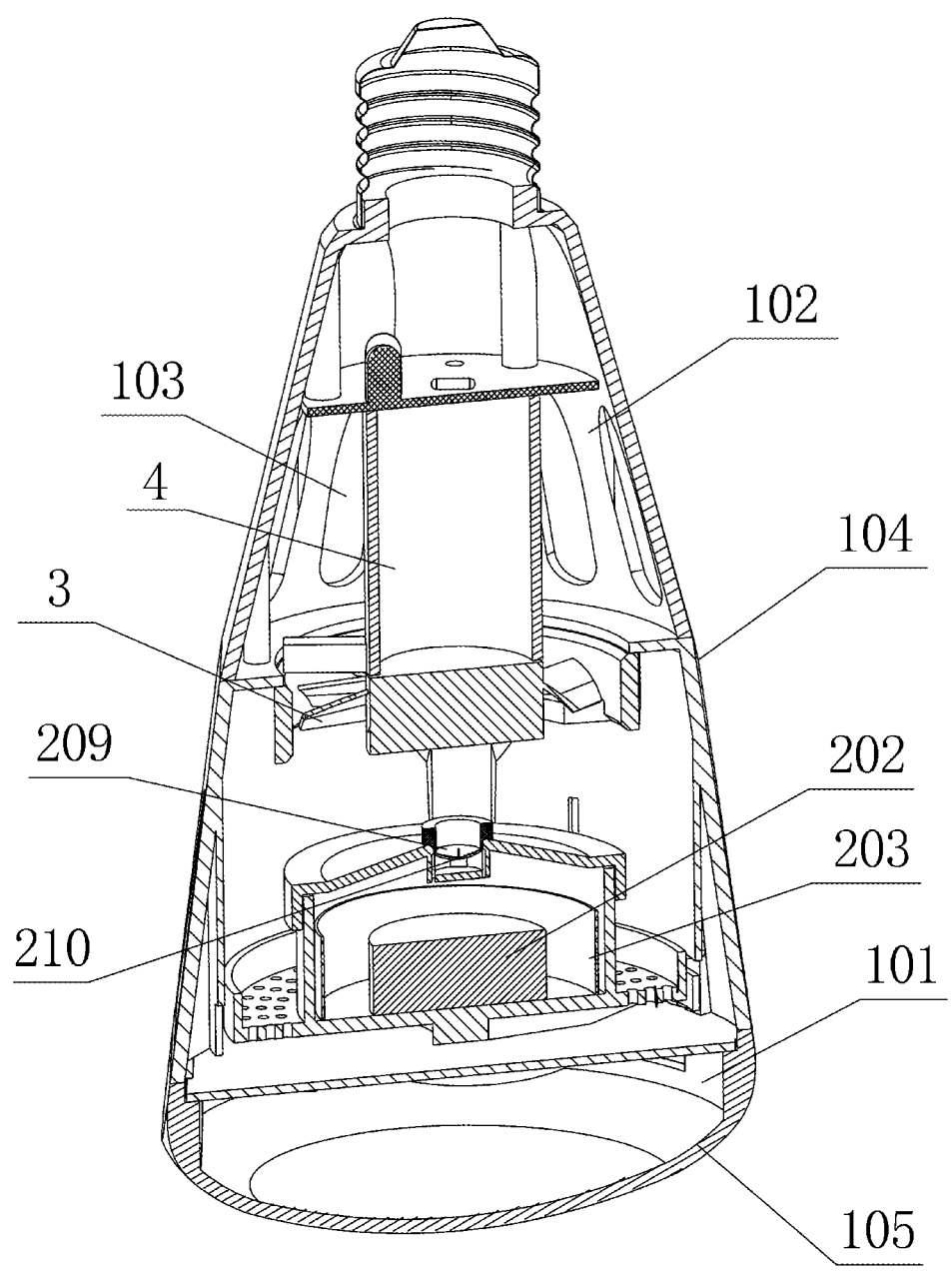
FIG. 2 is a sectional view of the mosquito-killing illuminating lamp of the present invention.
Figure 3:
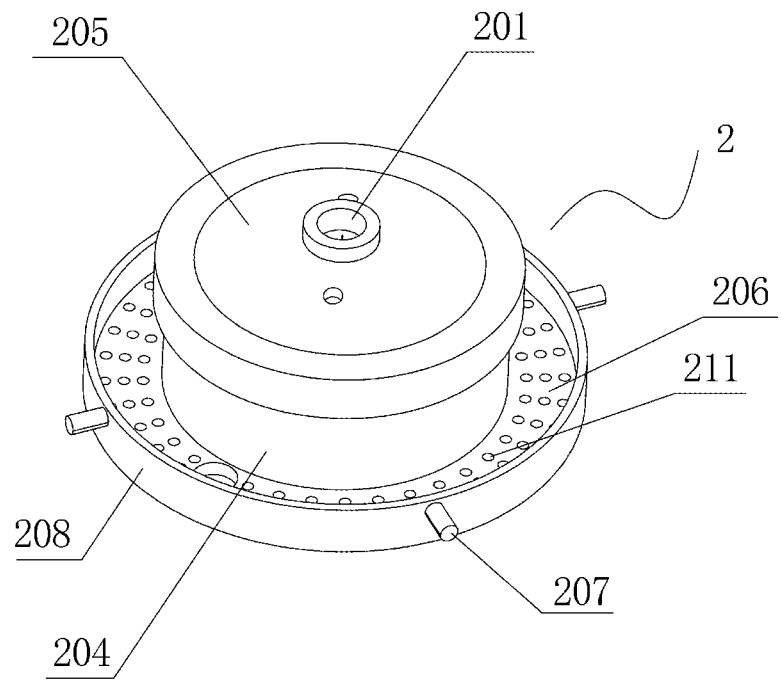
FIG. 3 is a perspective view of the carbon dioxide generating device of the mosquito-killing illuminating lamp of the present invention.
Figure 4:
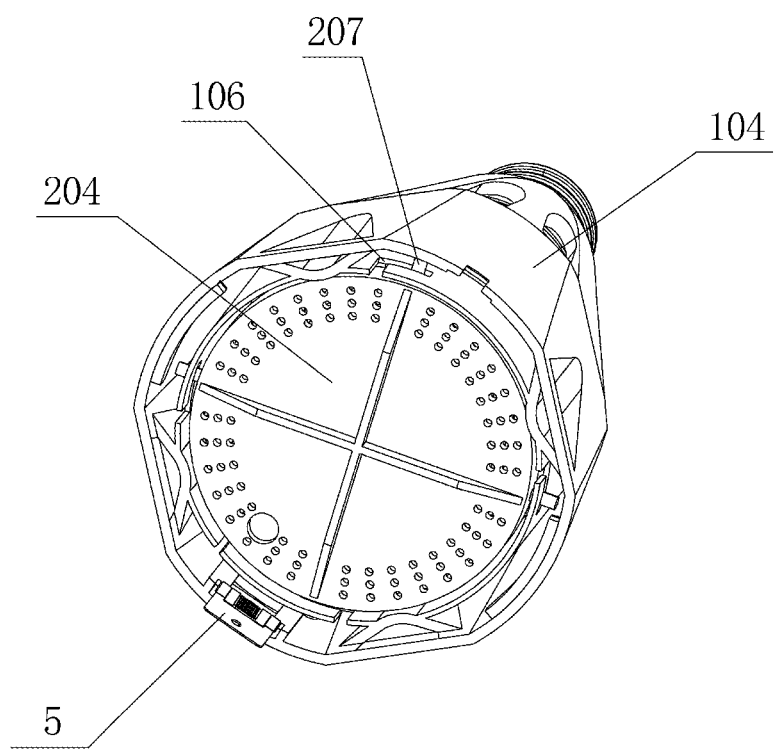
FIG. 4 is a perspective view showing the assembly of the carbon dioxide generating device and the upper casing of the mosquito-killing illuminating lamp of the present invention.
Figure 5:
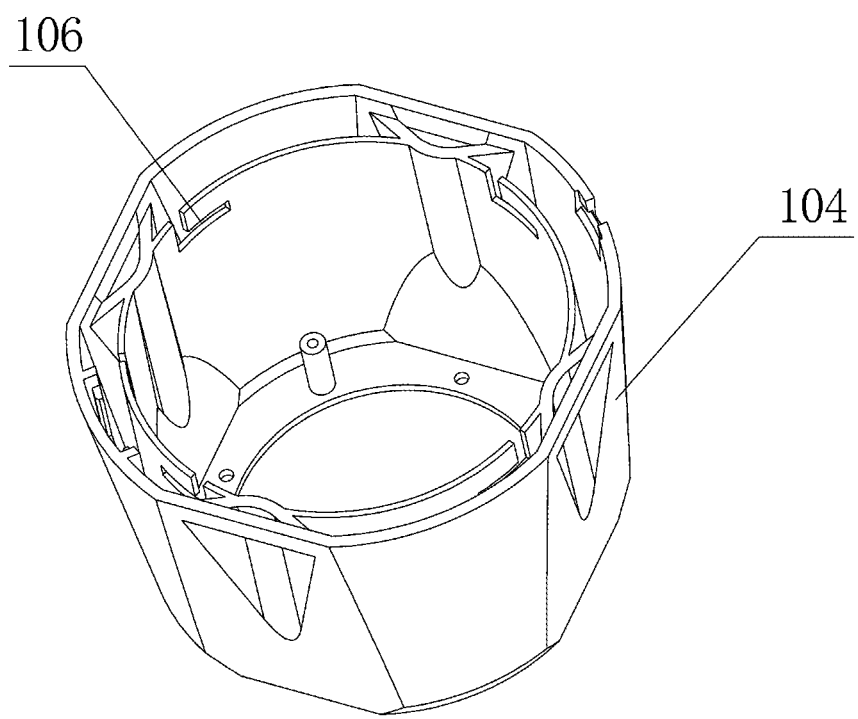
FIG. 5 is a perspective view of the upper casing of the mosquito-killing illuminating lamp of the present invention.
Figure 6:
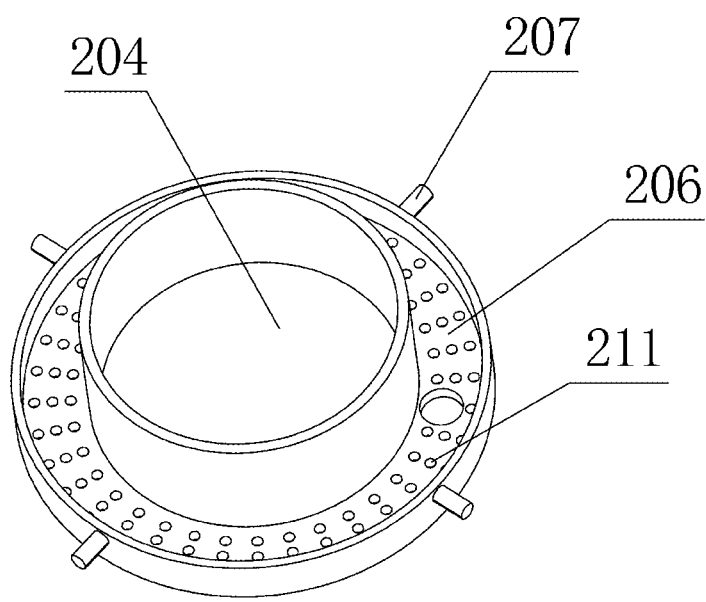
FIG. 6 is a perspective view of the bottom of the carbon dioxide generating device of the mosquito-killing illuminating lamp of the present invention.

As illustrated in FIGS. 1 and 2, the mosquito-killing illuminating lamp of the present invention comprises a casing 1 and a control unit. The casing 1 comprises an illuminating portion 101 and a mosquito-killing portion 102. The illuminating portion 101 is provided with illuminating components therein. The mosquito-killing portion 102 has a side wall which is provided with openings 103 for mosquitoes and insects to enter. An electrolysis carbon dioxide generating device 2 and a fan 3 are provided inside the mosquito-killing portion 102. The control unit controls operation of the illuminating components, the carbon dioxide generating device 2 and the fan 3.

The electrolysis carbon dioxide generating device 2 comprises a box body and electrolysis components. The electrolysis components comprise a graphite electrode 202 and a cathode plate 203. After conduction between the graphite electrode 202 and the cathode plate 203, electrolysis is performed on an electrolyte solution to generate carbon dioxide.

The carbon dioxide generating device 2 is capable of releasing carbon dioxide, and carbon dioxide can lure mosquitoes and insects. The fan 3 is capable of sucking the mosquitoes and insects into the casing and drying them to death. The illuminating lamp inside the illuminating portion 101 provides illumination function.

Based on the above structure, the present invention provides further improvements as follows:

As illustrated in FIGS. 3-6 the box body is removably attached inside the casing. The box body comprises a bottom 204 and a cover 205. The cover 205 covers on top of the bottom 204. Inverted L-shaped openings 106 which face downward are provided inside the casing. The bottom 204 has an outer wall which is provided with radial protruding rods 207. The radial protruding rods 207 are inserted into the inverted L-shaped openings 106.

The bottom 204 has an outer side wall which is provided with a radial flange 206. The radial flange 206 has an edge which extends upward to form a rim 208. The radial flange 206 is provided with a plurality of ventilation holes 211. The radial protruding rods 207 are disposed on an outer wall of the rim 208. A venting hole 201 is provided on top of the cover 205. The venting hole 201 is provided with a plug 209 inside. The plug 209 is provided with a cross-slit 210. The graphite electrode 202 is positioned in a middle portion of the bottom 204. The cathode plate 203 is positioned at an outer periphery of the graphite electrode 202.

The graphite electrode comprises the following in weight percentage:

| | |
|---|---|
| Graphite powder | 50%-90% |
| Adhesive | 10%-40% |
| First additive | 1%-30% |
| Second additive | 0.1%-10% |

The adhesive comprises at least one of phenolic resin, bisphenol A epoxy resin and urea formaldehyde resin.

The first additive is selected from at least one of the following: polylactic acid, carbonate, monosaccharide, oligosaccharide and polymethacrylates.

The second additive is selected from at least one of the following: carbon black, carbon nanotubes, silicon carbide, boron nitride, silicon oxide, aluminium oxide, zinc oxide, iron oxide, titanium dioxide, calcium carbonate, stearic acid, zinc stearate and calcium stearate.

The graphite electrode further comprises hexamethylenetetramine. The hexamethylenetetramine is present in an amount of 5-15 weight percentage of the adhesive.

The manufacturing process of the graphite electrode comprises the following steps: Mixing all components evenly to obtain a mixture, and then heat pressing and curing the mixture in a mold under 100-300 degrees Celsius and 10-60 MPa to obtain the graphite electrode.

The electrolyte solution in the box body may select from any one in prior art according to needs. The electrolyte solution is an aqueous solution of sulfate and/or bicarbonate. The electrolyte solution further comprises 0-10 weight percentage of glucose. The electrolyte solution has a pH value of 6-9. The aforementioned electrolyte solution could interact with the graphite electrode to increase the carbon dioxide in the electrolytic gas. In particular, after adding glucose, the carbon dioxide in the electrolytic gas can be increased by about 2v %.

When the graphite electrode with the aforementioned structure is used as the anode plate in the electrolytic cell of the carbon dioxide generating device 3, the carbon dioxide in the gas produced by electrolysis could reach 10v %, and the gas produced is stable in quantity. It is especially suitable for use as consumables in mosquito-killing apparatus and plant growth apparatus. It is easy to replace, and has good energy saving and consumption reducing effects and is more environmental friendly.

The fan 3 is positioned above the carbon dioxide generating device 2. The fan 3 has an upward facing air inlet and a downward facing air outlet. A mosquito-luring lamp 4 is provided inside the casing. The mosquito-luring lamp 4 is positioned above the fan 3.

The casing 1 comprises an upper casing 104 and a lower casing 105. The mosquito-killing portion 102 is formed inside the upper casing 104. The illuminating portion is formed inside the lower casing 105. A first side of the lower casing 105 is pivotally connected to a first side of the upper casing 104. A second side of the lower casing 105 is connected to a second side of the upper casing 104 by a buckle. A gap is provided between the upper casing 104 and the lower casing 105. The first side of the lower casing 105 is connected to the first side of the upper casing 104 by a hinge 5. The openings 103 are provided on a side wall of the upper casing 104. There are a plurality of the openings 103.

The operating principle of the present invention is as follows: Activate the electrolysis carbon dioxide generating device 2 and the fan 3; the carbon dioxide generating device 2 releases carbon dioxide which spreads in the surrounding of the illuminating lamp. Mosquitoes and insects are lured by the carbon dioxide into the upper casing 104. The fan 3 sucks the mosquitoes and insects into the casing and dries them to death. The dead mosquitoes and insects drop on the radial flange 206 of the bottom 204.

The control unit controls the mosquito-killing illuminating lamp of the present invention by the following controlling method:

When illumination is needed, press the switch connected to the control unit once to actuate the switch to the first position; the control unit controls the illumination of the illuminating lamp and activates illuminating function.

When illumination and mosquito-killing functions are both needed, press the switch again to actuate the switch to the second position; the control units controls the operation of the carbon dioxide generating device and the fan, thus activating illumination and mosquito-killing functions.

When mosquito-killing is needed but illumination is not needed, press the switch again to actuate the switch to the third position; the control units switches off the illuminating lamp and maintain operation of the carbon dioxide generating device and the fan, thus activating the mosquito-killing function without illumination.

When the switch is pressed again, the switch is actuated to the fourth position; the control units stops operation of the carbon dioxide generating device and the fan, thus switching off illumination and mosquito-killing functions.

What is claimed is:

1. A mosquito-killing illuminating lamp, characterized in that it comprises a casing and a control unit; the casing comprises an illuminating portion and a mosquito-killing portion; the illuminating portion is provided with illuminating components therein; the mosquito-killing portion has a side wall which is provided with at least one opening for mosquitoes and insects to enter; an electrolysis carbon dioxide generating device and a fan are provided inside the mosquito-killing portion; the control unit controls operation of the illuminating components, the carbon dioxide generating device and the fan;

the electrolysis carbon dioxide generating device comprises a box body and electrolysis components; the electrolysis components are provided inside the box body; an electrolyte solution is provided inside the box body; the box body is provided with a venting hole; the electrolysis components comprise a graphite electrode and a cathode plate; after conduction between the graphite electrode and the cathode plate, electrolysis is performed on the electrolyte solution to generate carbon dioxide.

2. The mosquito-killing illuminating lamp as in claim 1, characterized in that the box body is removably attached inside the casing; the box body comprises a bottom and a cover; the cover covers on top of the bottom.

3. The mosquito-killing illuminating lamp as in claim 2, characterized in that inverted L-shaped openings which face downward are provided inside the casing; the bottom has an outer wall which is provided with radial protruding rods; the radial protruding rods are inserted into the inverted L-shaped openings.

4. The mosquito-killing illuminating lamp as in claim 3, characterized in that the bottom has an outer side wall which is provided with a radial flange; the radial flange has an edge which extends upward to form a rim; the radial flange is provided with a plurality of ventilation holes; the radial protruding rods are disposed on an outer wall of the rim.

5. The mosquito-killing illuminating lamp as in claim 4, characterized in that the venting hole is provided on top of the cover; the venting hole is provided with a plug inside; the plug is provided with a cross-slit.

6. The mosquito-killing illuminating lamp as in claim 4, characterized in that the fan is positioned above the carbon dioxide generating device; the fan has an upward facing air inlet and a downward facing air outlet.

7. The mosquito-killing illuminating lamp as in claim 6, characterized in that a mosquito-luring lamp is provided inside the casing; the mosquito-luring lamp is positioned above the fan.

8. The mosquito-killing illuminating lamp as in claim 6, characterized in that the casing comprises an upper casing and a lower casing; the mosquito-killing portion is formed inside the upper casing; the illuminating portion is formed inside the lower casing; a first side of the lower casing is pivotally connected to a first side of the upper casing; a second side of the lower casing is connected to a second side of the upper casing by a buckle; a gap is provided between the upper casing and the lower casing.

9. The mosquito-killing illuminating lamp as in claim 8, characterized in that the first side of the lower casing is connected to the first side of the upper casing by a hinge.

10. The mosquito-killing illuminating lamp as in claim 8, characterized in that the openings are provided on a side wall of the upper casing; there are a plurality of the openings.

\* \* \* \* \*